Patented Aug. 26, 1941

2,253,798

UNITED STATES PATENT OFFICE 2,253,798

PROCESS FOR THE MANUFACTURE OF PARTIALLY REDUCED POLYCARBONYL COMPOUNDS OF THE CYCLOPENTANOPOLYHYDROPHENANTHRENE SERIES

Karl Miescher, Riehen, and Werner Fischer, Basel, Switzerland, assignors, by mesne assignments, to Ciba Pharmaceutical Products, Incorporated, Summit, N. J., a corporation of New Jersey No Drawing. Application November 25, 1938, Serial No. 242,414. In Switzerland December 24, 1937

8 Claims. (Cl. 260—397.4)

Diketones of the saturated and unsaturated cyclopentanopolyhydrophenanthrene series have already been partially reduced. Thus, Mamoli and Vercellone (B. 70, 470 [1937]) have obtained testosterone from androstene-3:17-dione by a bio-chemical method using a fermenting yeast. This process, however, on account of the necessity for working up large quantities of liquid, especially in large installations, is very tedious.

Attempts have also been made to reduce androstene-dione partially in 17-position by a purely chemical method. The processes hitherto described, however, do not give satisfactory yields of testosterone. This invention relates to a process of partially reducing polycarbonyl compounds of the saturated or unsaturated cyclopentanopolyhydrophenanthrene series by a purely chemical method which surprisingly affords especially good yields. The process consists in causing the polycarbonyl compound to react in the presence of a catalyst with an alcohol capable of being oxidized to a carbonyl compound. In this process there is an exchange of oxidation stages.

Alcohols capable of being oxidized to carbonyl compounds are the primary and secondary alcohols, for example, isopropyl alcohol, normal or secondary butyl alcohol, the amyl alcohols, benzyl alcohol, cyclohexanol and the like. The said alcohols may simultaneously be used as solvents; however, indifferent solvents may be added, for instance benzene, toluene, hexane or the like.

As catalysts there are used especially metalalcoholates and -acylates as those of alkaline earth and alkali metals e. g. aluminium, magnesium or magnesium halides (aluminium butylates, aluminium iso-propylate, sodium ethylate, sodium acetate etc.).

Among the polycarbonyl compounds of the cyclopentanopolyhydrophenanthrene series which may be used as parent material there may be named, for example, di- or tricarbonyl compounds of the saturated or unsaturated androstane and pregnane series, especially for instance $\Delta^{4:5}$-androstene-3:17-dione, $\Delta^{5:6}$-androstene-3:17-dione, $\Delta^{4:5}$-pregnene-3:20-dione, pregnane 3:20-dione, allo-pregnane - 3:20 - dione, androstane-3:7:17-trione, $\Delta^{4:5}$-17-hydroxy-3:20:21-trioxopregnene, as well as homologues and stereoisomerides of these.

In contrast with the aforesaid biochemical process, the process is very simple even on a large scale. The partially reduced compounds formed may easily be separated from by-products and unchanged parent material, for example with the aid of ketone reagents, such as the halides of pyridinium acetic acid hydrazide or of trimethylammonium acetic acid hydrazide, and/or with carbinol reagents, such as for example phthalic acid anhydride or succinic acid anhydride.

The following example illustrates the invention:

3 parts by weight of androstene-dione, 2.6 parts of aluminium tertiary butylate and 39 parts of absolute secondary butyl alcohol are heated together in 300 parts of absolute benzene for one hour to boiling. Then in the course of several hours 150 parts of benzene, together with the methylethyl ketone produced are distilled. Fresh benzene is added and the distillation repeated. These operations may be repeated several times. Finally, the mixture is diluted with benzene and extracted with N-sulfuric acid and then washed with dilute caustic soda solution and water until the reaction is neutral.

After evaporating the solvent the product remaining is taken up in 30 parts of methanol, 3 parts of chloride of pyridinium acetic acid hydrazide and 0.3 part of glacial acetic acid are added and the whole heated for one hour to boiling. The solution is then poured into so much water containing ice that the aqueous solution still contains 10-20 per cent. of alcohol. After neutralizing, while cooling, 9/10 of the acetic acid with dilute sodium carbonate solution, non-ketonic constituents are obtained by thorough extraction with ether. The mother liquor is mixed with a little 2-N-hydrochloric acid and finally again shaken with ether. After working up these ether fractions trans-testosterone of melting point 153-155° C. is obtained by recrystallization from isopropyl ether. From the mother liquor small quantities of cis-testosterone as well as a little dehydroandrosterone may be isolated.

The reduction may be conducted also without addition of an indifferent solvent. As the reducing agent some other primary or secondary alcohol, for instance n-butyl alcohol or isopropyl alcohol, may be used with addition of another alcoholate, for instance aluminium n-propylate or -isopropylate or -butylate, magnesium halide butylate and the like.

Instead of aluminium tertiary butylate there may also be used for instance a metal acylate such as an alkali acetate.

What we claim is:

1. A process for the manufacture of partially reduced polycarbonyl compounds of the cyclopentanopolyhydrophenanthrene series which comprises causing polycarbonyl compounds of the said series to react with a member of the group consisting of primary and secondary alcohols in the presence of an alcoholate of a member of the group consisting of aluminium and the alkaline earth metals and their halides, which alcoholate is of catalytic effect, said reaction being effected in the absence of nascent hydrogen.

2. A process for the manufacture of partially reduced polycarbonyl compounds of the unsaturated cyclopentanopolyhydrophenanthrene series, comprising causing unsaturated polycarbonyl compounds of the said series to react with a member of the group consisting of primary and secondary alcohols in presence of an alcoholate of a member of the group consisting of aluminium, and the alkaline earth metals and their halides.

3. A process for the manufacture of partially reduced dicarbonyl compounds of the unsaturated cyclopentanopolyhydrophenanthrene series, comprising causing dicarbonyl compounds of the said series to react with a member of the group consisting of primary and secondary alcohols in presence of an alcoholate of a member of the group consisting of aluminium, and the alkaline earth metals and their halides.

4. A process for the manufacture of testosterone, comprising causing $\Delta^4$-androstene-3,17-dione to react with a member of the group consisting of primary and secondary alcohols in presence of an alcoholate of a member of the group consisting of aluminium, and the alkaline earth metals and their halides.

5. A process for the manufacture of testosterone, comprising causing $\Delta^4$-androstene-3:17-dione to react with a member of the group consisting of primary and secondary alcohols in presence of an alcoholate of a member of the group consisting of aluminium, and the alkaline earth metals and their halides, and then separating testosterone from by-products and unchanged parent material.

6. A process for the manufacture of testosterone, comprising causing $\Delta^4$-androstene-3,17-dione to react with a secondary alcohol in the presence of aluminium tertiary butylate, and then separating testosterone from by-products and unchanged parent material by means of a halide of a basic substituted acetic acid hydrazide.

7. A process for the manufacture of testosterone, comprising causing $\Delta^4$-androstene-3,17-dione to react with a secondary alcohol in the presence of aluminium tertiary butylate, and then separating testosterone from by-products and unchanged parent material by means of a halide of pyridinium acetic acid hydrazide.

8. A process as claimed in claim 7, wherein the reduction is conducted with addition of an indifferent solvent.

KARL MIESCHER.
WERNER FISCHER.